Patented Feb. 24, 1948

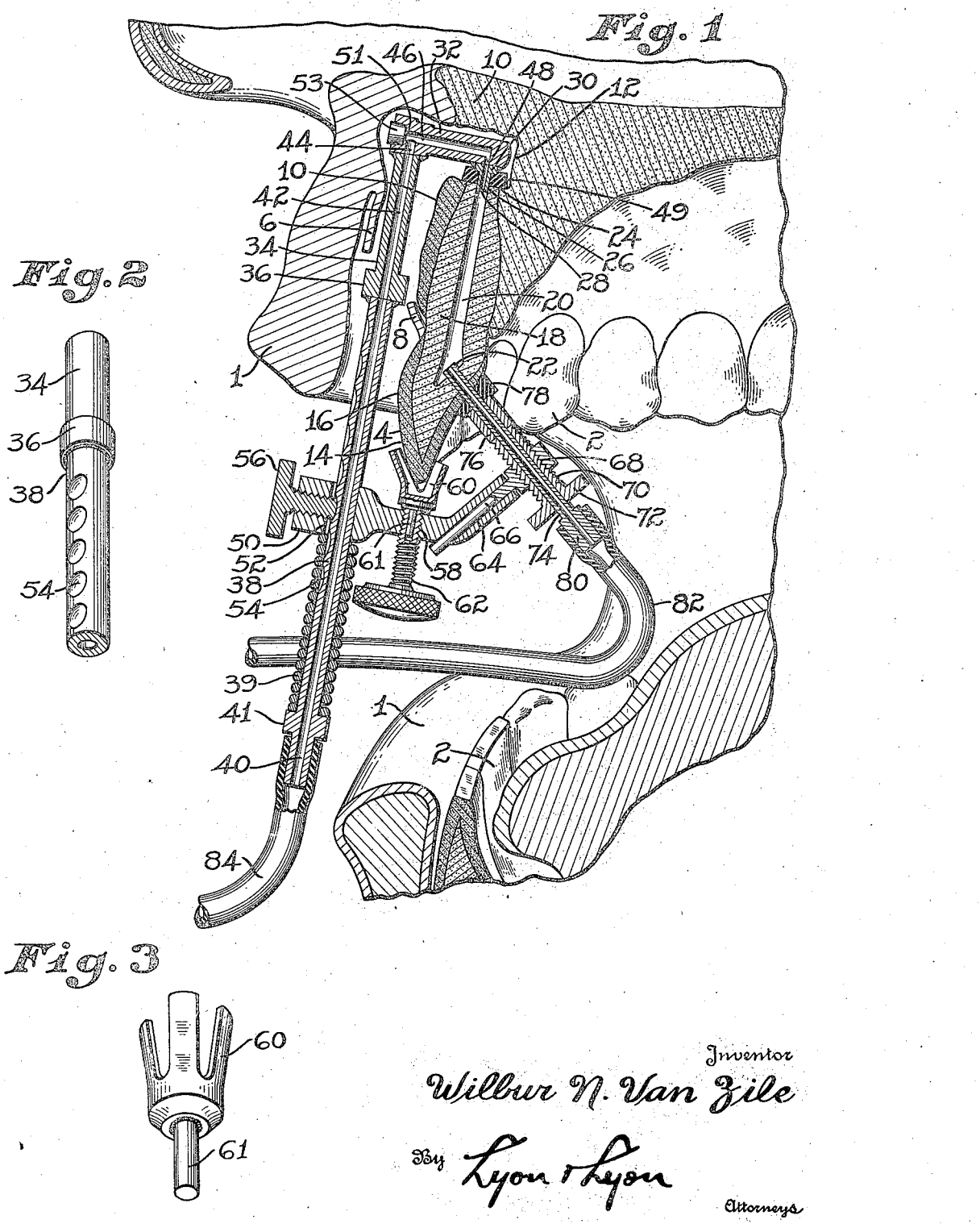

2,436,623

UNITED STATES PATENT OFFICE 2,436,623

METHOD AND APPARATUS FOR ROOT CANAL TREATMENT

Wilbur N. Van Zile, Corona, Calif.

Application September 14, 1946, Serial No. 697,033

20 Claims. (Cl. 32—1)

1

My invention relates to root canal treatment and more particularly to a method and apparatus for such root canal treatment wherein during said treatment the root canal is sealed in such manner as to provide for continuous irrigation.

In a tooth the dental pulp occupies a space in the approximate center of the tooth running from the root end to the crown of the tooth, known as the "root canal."

When external factors, such as decay, thermal or chemical shock from deeply placed fillings or blows, produce irritation to the dental pulp, an inflammatory process ensues in the dental pulp. If the defensive processes of the dental pulp are adequate to overcome the irritation, it will subsequently return to a normally healthy condition. This is accomplished as a result of the laying down of secondary dentine by the odonto-blasts, thus forming additional tooth structure between the dental pulp and the external irritating factor.

However, when the external irritation is of such magnitude that the dental pulp is unable to protect itself, the inflammatory process resulting causes swelling or edema of the dental pulp. Because the dental pulp is located in a canal surrounded by unyielding tooth structure, the pressure soon causes a constriction of the blood vessels of the dental pulp and death of the pulp tissue results. This is described as a non-vital tooth. In most cases, the irritating factor is dental decay. The bacteria involved in dental decay infect the dead pulp tissue and a wet or moist gangrene ensues. When the external irritating factor is thermal, chemical or traumatic in nature, the bacteria may not immediately reach the dental pulp, and this results in a dry or mummifying gangrene. Subsequently, however, bacteria may be introduced into the root canal either externally or via an infected blood stream. In either wet or dry gangrene, an infected root canal usually results. Because there is no longer a blood supply to the infected root canal, it is impossible for nature to overcome the infection.

The products of infection and the bacteria are gradually forced or progress into the bone tissue surrounding the apex or entrance to the root canal. The tissue exposed to this irritation and infection attempts to "wall off" or isolate the infection by developing a dense fibrous sac about the area of infection. Such a tooth is said to be abscessed, and the condition may vary from acute to chronic in virulence. The acute abscess is quite painful while the chronic abscess will produce little or no pain. In chronic abscesses, the patient may be unaware of the condition.

If the bone tissue about the apex of an infected tooth has little resistance, the toxic products from the bacterial action and even the bacteria may be readily absorbed into the blood stream. In such cases, a fibrous sac or abscess may not be formed. Such an infected tooth is a menace to the general health of the patient.

In the early days of dentistry there was no appreciation of the above phenomena. In fact, many practitioners sealed arsenic in cavities for short periods of time in order to place fillings painlessly. This resulted in killing or devitalizing the dental pulp. It was not until some years later when investigators determined that this sequence of events was responsible for large numbers of abscessed teeth. Methods of treatment were devised to prevent the onset of such sequelae. These various types of treatment are known as "root canal therapy." If root canal treatment is not instituted, the tooth must be extracted in order to eliminate the infection. Root canal therapy attempts to accomplish the following:

1. Removal of all infected pulp tissue.

2. Removal of infected abscess tissue about the apex of an infected root.

3. Cleaning the root canal mechanically with instruments.

4. Sterilizing the root canal with various chemical agents.

5. Filling and sealing the root canal with various plastic materials in order to prevent a recurrence of infection in the root canal space (no blood supply).

In general, in order to accomplish proper root canal therapy, three general methods of approach have heretofore been practiced.

Approach No. 1

In the first method, a small hole is drilled through the crown portion of the tooth into the root canal space. All instrumentation is carried out through this hole with various small wire instruments known as broaches, files, reamers, etc. Chemical agents are also introduced through this hole to accomplish sterilization of the canal. The plastic filling material is also introduced through this hole to fill and seal the canal. To carry out this method of treatment, several sittings are necessary over a period of one or two weeks in order to allow ample time for the relatively mild chemical agents (which must be used in order to prevent cauterization of the live tissues beyond the root apex) to complete the process of sterilization. Since the operator is working only from the lower end of the root canal, there is considerable guesswork required to place the drugs at the root end of the root canal (apex) which is the critical spot. If the apex is not sterilized or not sealed by the plastic material later introduced, reinfection will probably occur. If multiple apical foramina are present, the proper sterilization and filling becomes more difficult, if not impossible. In any event the dental operator cannot know positively whether or not these foramina are sterile and sealed. Even where there is but one single root canal, instrumentation while placing the filling material may cause hemorrhage from the tissues just beyond the apex. This moisture would prevent hermetically sealing the root canal with the plastic material. If the infective condition has proceeded to abscess formation in the bone tissue about the apex of the tooth root, it is impossible to remove this infected tissue through the root canal.

Summarizing the disadvantages present in this type treatment, it may be stated that:

1. Multiple treatments are necessary.
2. Instrumentation is, at best, haphazard.
3. It is not possible to use strong germicidal and bleaching agents to sterilize the root canal because of the damage such agents might produce in the live bone tissue beyond the apex of the root. Sterilization is therefore not positive.
4. Multiple apical foramina (microscopic) cannot be properly sterilized or filled because of lack of access.
5. Infected tissue in the bone beyond the root apex cannot be removed or positively treated, resulting in the probable remaining of the abscess.
6. Hemorrhage or weeping of the bone tissues beyond the root apex prevents sealing the plastic filling material to the hard walls of the root canal. Without a seal, microscopic spaces occur between the root canal walls and the filling material. Such spaces provide an ideal incubating space for future reinfection wherein the infection resisting factors contained in blood cannot penetrate. Such a situation results in reinfection and abscess formation.
7. No appreciable indentations of the dentinal tubules by the sterilizing and bleaching agents exist. In such tubules bacteria, blood stains and putrefactive products exists, and if permitted to remain will discolor the tooth.

Approach No. 2

In this method all of the steps of Approach No. 1 are first carried out. After the treating and filling of the root canal as in Approach No. 1, and in order to overcome disadvantages 4 and 5 enumerated above, the gingival tissues (gum tissues) are resected in the area of the involved tooth and a hole is cut through the overlying bone in the region of the tooth root apex. When this bone has been removed, the root apex is accessible. The infected tissue (abscess) beyond the root apex can now be curetted out. In order to eliminate the possibility of microscopic multiple foramina, the tooth root is also resected for a distance of approximately two to four millimeters. The other disadvantages of Approach No. 1 still remain.

Approach No. 3

Here an attempt is made to eliminate as well as possible all the disadvantages enumerated under Approach No. 1. After drilling the hole through the crown portion of the tooth and at the outset, the hole is cut through the overlying bone in the region of the tooth root apex as in Approach No. 2. The entire treatment is carried out in one sitting, the tooth being left open at both ends. Instrumentation through the canal removes debris in the canal and, since both ends of the canal are under observation, instrumentation is no longer haphazard as when working only from the crown end.

Likewise, it is now possible to use stronger chemical agents because the apical end of the canal is under control to a limited degree. However, it is inadvisable to use exceptionally strong germicidal and bleaching agents because it is still possible that such agents might be dropped on mouth tissues or leak from the apical end of the canal into the surrounding live bone tissue, resulting in the cauterization of these tissues.

Disadvantage 6 enumerated in Approach No. 1 still persists. While hemorrhage can be controlled in the surrounding apical bone to some extent, it is difficult, and frequently blood enters the apical root canal after the sterilizing drugs have been applied, thus reinfecting the canal with bacteria still present in the operating field. If blood enters the root end of the root canal while the plastic filling material is being placed, not only is infected material reintroduced but the seal of the plastic material to the sides of the root canal is impaired and future reinfection may occur. Likewise, disadvantage 7 remains. Summarizing, disadvantages 1, 2, 4 and 5, enumerated in Approach No. 1, are eliminated by Approach No. 3. Disadvantage 3 is only partially eliminated because only slightly more powerful germicidal agents may be used and only limited quantities of such agents can be introduced into the canal by hand instrumentation. Disadvantage 6 is also only partially eliminated because control of hemorrhage is still difficult, and it is impossible to penetrate the dentinal tubules to eliminate disadvantage 7. An additional disadvantage is introduced; that is, because of the time required to complete the treatment and fill the root canal in one sitting, there is considerable handling and retraction of the soft tissue flap during the course of carrying out the above steps. This results in postoperative soreness and swelling.

It is the principal object of my invention to provide apparatus and method for root canal therapy whereby the root canal is sealed and isolated and treatment of the said root canal takes place during such sealing and isolation.

It is my further object to aspirate through the root canal solutions of chemical agents of such nature as to clean, sterilize and bleach the root canal without danger to the surrounding live tissues.

It is another of my objects to prevent, after root canal therapy, the recontamination of the canal by foreign substances in the field of operation.

Yet another object of my invention is the keeping of the root canal dry while plastic filling material is placed therein, thus eliminating the possibility of the preventing of a sealing between the plastic material and the walls of the root canal by moisture.

Another of my objects is the prevention of hemorrhage or weeping substances of the bone tissues beyond the root apex from entering the root canal during the operation. Since two principal factors cause reinfection of the root canal and subsequent new abscess formation in the tissues about the apex of the root, namely, incomplete sterilization of the infected root canal and incomplete sealing of the plastic filling material to the walls of the root canal because of the presence of moisture, it will be seen that, so long as the root canal is maintained sealed during the operation, microscopic spaces between filling material and root wall are not encouraged and the reestablishment of blood-borne bacteria is substantially eliminated.

It is a further object of my invention to provide negative pressure within the root canal affecting the open dentinal tubules and removing impurities therefrom so that later application of germicidal agents may reach same and assure positive cleaning, sterilization and bleaching.

A still further object of my invention is to provide a root canal therapy completed in substantially less time whereby postoperative swelling and pain due to the handling and retraction of the tissues is substantially lessened or eliminated. This is made possible by the ability of the operator to use stronger and larger volumes of germicidal agents in the course of the operation. Again, by virtue of the fact that the operator using my apparatus may treat the root canal from a convenient place with respect to the tooth, lessening of handling of the tissue flap and of possible injury or bruising of other tissues about the root apex results.

With the above and other objects in view as may appear hereinafter, reference is directed to the accompanying drawings, in which:

Figure 1 shows a section taken through my apparatus for root canal therapy, the said apparatus being shown in operative position within the mouth of a patient.

Figure 2 shows a perspective view of a portion of my apparatus.

Figure 3 shows a perspective view of a part of my apparatus, the forked wedge.

Referring to the drawings, the lips 1 have adjacent thereto the teeth 2, one of such teeth as shown being an incisor 4. A gum flap 6 is shown cut away from the gum 8 providing access to the bone 10 which is shown having a hole 12 cut thereinto. The incisor 4 has a crown 14, enamel 16 and dentine 18. The dentine 18 defines a root canal 20, and a hole 22 is shown drilled through the enamel 16 and the dentine 18 into the said root canal 20. Frequently the root apex of the tooth will have multiple apical foramina. The root apex 24 is shown (Figure 1) resected below such multiple foramina. A hole 26, which is the exit of root canal 20, has been reamed larger by instrumentation.

A needle 28 is shown inserted into the hole 26 having a flange 30 welded to the upper cross arm 32. Welded to the said upper cross arm 32 is a sleeve 34 ending in a flange 36, while welded to such flange 36 is the vertical arm 38. The vertical arm 38 has a continuous bore 40 matching the bore 42 in the sleeve 34. Through the orifice 44 the bore 42 enters into the bore 46 in the cross arm 32 and an orifice 48 leads from the said bore 46 to the needle 28, the needle 28 carrying a rubber or otherwise sealing gasket 49. The bore 46 of the upper cross arm 32 opens into a seat 51 at the extremity of the said upper cross arm 32 and adapted to seal such opening is a rubber plug 53.

A lower cross arm 50 is bored at 52 to receive the vertical arm 38 which is serrated as at 54 to provide catches for the end of the set screw 56. Carried by the vertical arm 38 is the compression spring 39 which abuts against the said lower cross arm 50 and a flange 41 forming a part of the said vertical arm 38. The lower cross arm 50 is also bored at 58 to receive the threaded screw 62, said bore 58 being threaded to engage the screw 62, the said screw 62 having a bore to slidably receive the forked wedge 61. Again, the lower cross arm 50 has a longitudinal bore 64 to slidably receive the eye piece 66, the said eye piece 66 having a threaded bore 68 to threadedly receive the exteriorly threaded bushing 70 which carries a flange 72. Carried slidably within the said bushing 70 is the sleeve 74 which is adapted to extend into the root canal from the lingual surface of the crown 14 through the hole 22. The sleeve 74 carries a collar 76 and a rubber or otherwise sealing gasket 78.

The sleeve 74 is inserted by its flange 80 to a rubber hose 82 while a rubber hose 84 is likewise carried by the vertical arm 38.

The technique for using my new method and apparatus comprising drilling the small hole 22 in the crown 14 on the lingual surface of the tooth to be treated. A gingival flap 6 is resected above the root of the tooth. A hole 12 is cut through the bone until the root end of the tooth is uncovered. The root is now resected for a short distance to remove multiple apical foramina and trimmed to a flat surface approximately at right angles to the long axis of the tooth. All infected tissue such as abscesses, if present, is curetted from the bone about the apex 24 of the tooth. Root canal reamers are run through the tooth canal. Such reamers are progressively larger. The largest is of sufficient size to enlarge the root canal at the apical end 24 sufficiently to permit the needle 28 of the instrument to drop in to the root canal.

The set screw 56 being loosened, the lower cross arm 50 of the instrument is slid down the vertical arm 38 to a distance about one-half inch below the tooth and fixed into position by the said set screw 56. The needle 28 is now inserted through the bone aperture 12 and dropped into the top of the root canal 20. Sealing is provided by the gasket 49. The set screw 56 is now released, and the spring 39 forces the forked wedge 60 against the incisal edge of the tooth. The apical entrance to the root canal is now sealed. A common and well known water syringe is attached by the hose 84 to the lower end of the vertical arm 38 of the instrument. A small amount of water is flushed through the root canal 20 to remove debris and blood present in the said canal. The eye piece 66 is now dropped into place in the bore 64 of the cross arm 50 of the instrument. The sleeve 74 is rotated until aligned with the hole 22 previously drilled in the lingual surface of the crown of the tooth. The said sleeve 74 is now pressed into the hole 22 for about one millimeter and the flange 72 turned until the gasket 78 is pressed tightly against the tooth. The root canal is now sealed top and bottom, therefore isolated, and prepared for continuous irrigation in a closed system.

Chemical agents of any kind and any strength can be aspirated through the root canal with no danger to the surrounding tissues. Such chemical agents can include, as will later be set forth, cleaning or washing, sterilizing and bleaching agents. For bleaching, negative pressure is applied to the system by virtue of the hoses 82 and 84 to dehydrate the open dentinal tubules, thus enabling the bleaching agent to be introduced thereinto.

After the aforesaid continuous irrigation, warm air is aspirated through the system to thoroughly dry the root canal and the root canal is filled with a plastic cement. Said plastic cement, which is a common dentinal substance, is placed in an ordinary pressure syringe which is fitted to the flange 80 of the sleeve 74, the hose 82 being removed. At the same time, the plug 53 is removed from the upper cross arm 32, the hose 84 removed, and an ordinary wire run up the bore 40 and the bore 42. Thus, when the plastic filling material is introduced into the root canal, excess passing through the bore 46 will not enter the sleeve 34 and the vertical arm 38. When the root canal has been filled with the plastic material, the needle 28 is displaced from the root canal by loosening screw 62 which allows decompression of rubber gasket 30. Decompression of rubber gasket 30 lifts needle 28 from the hole 26. As screw 62 is loosened, pressure on the syringe containing the plastic filling material forces the filling material through hole 26, the excess flowing out over the root end. When the filling material has set, the instrument is removed and the excess filling material curetted from the root end, leaving the root canal filled flush with the apex. The tissue flap 6 is returned to its original position and sutured, and the operation is complete.

My method was devised in order to secure positive control of the root canal by hermetically sealing off both ends of the canal with my instrument which allows communication with and continuous irrigation of the canal from the exterior. Both ends of the root being sealed, blood and bacteria cannot enter the root canal during treatment nor can the chemical agents aspirated through the canal escape into the bone tissues or into the mouth. The operator can use any chemical agents he chooses and of any strength. Thus the canal can be cleansed with strong acids such as 50% sulphuric. It can be sterilized with agents such as 90% phenol or both sterilized and bleached with agents such as 30% hydrogen peroxide. These chemicals can be aspirated through the root canal in large volume as compared with only a few drops of relatively weak chemicals in the old method. The chemicals likewise can be aspirated through the tooth in high velocity resulting in additional mechanical cleansing of the root canal.

In so far as concerns bleaching, a common aspirating pump attached to the flange 80 of the sleeve 74 can establish a negative pressure within the root canal due to the fact that the tooth is sealed off by my instrument. In this operation, while the pump is operating, I squeeze closed the hose 84. With this negative pressure, it is possible to aspirate the moisture from the open microscopic dentinal tubules. A strong acid source being attached to the hose 84 when the squeezing of the said hose ceases, said acid will be pumped into the said open dentinal tubules. Continuous squeezing and releasing of the said hose 84 will result in a repeated flushing of the open dentinal tubules and a removing of organic material and bacteria therefrom. The same method may be used to pump into the tubules the bleaching substance; and microscopic dentinal tubules which would not otherwise be reached by such bleaching agent are thereby entered and later discoloration of the tooth is avoided.

I have accomplished the entire operation within 45 minutes while the shortest time in which I have accomplished the aforementioned Approach No. 3 has been 75 minutes. During the whole time while utilizing the said Approach No. 3, the soft tissue flap necessarily was under retraction. Using my method and apparatus, the tissue flap need be retracted only while placing and removing the instrument, approximately 20 minutes. Thus the tissues are retracted in my method for about one-third the time required in the Approach No. 3, and as a result thereof there is little or no postoperative swelling and soreness.

Having fully described my invention, it is understood that I do not wish to be limited to the details herein set forth, but my invention is of the full scope of the appended claims.

I claim:

1. A method of root canal therapy comprising: enlarging a hole in the root apex of a tooth, said hole entering the root canal; drilling a hole in the crown portion of said tooth, said hole entering the said root canal; providing conduits leading into said root canal through said holes; sealing said conduits at said holes to provide a closed system about said root canal; and aspirating washing, germicidal, and bleaching agents through said canal.

2. A method of root canal therapy comprising: entering said root canal at its root apical end; entering said root canal at its crown end; providing sealed aspirating means at said root apical and said crown entering places; and flowing treating agents through said root canal by means of said aspirating means.

3. A method of root canal therapy comprising: exposing the root apex of a tooth; enlarging a hole through the root apex into said root canal; drilling a hole in the crown portion of said tooth; reaming and washing said root canal; sealing aspirating means at said aforementioned holes; aspirating treating agents through the closed system formed by said sealed aspirating means; and filling said root canal with a plastic dental material.

4. A method of root canal therapy comprising: exposing the root apex of a tooth; enlarging a hole through the root apex into said root canal; drilling a hole in the crown portion of said tooth; reaming and washing said root canal; sealing aspirating means at said aforementioned holes; aspirating treating agents through the closed system formed by said sealed aspirating means; establishing a negative pressure in said closed system for the purpose of cleaning open dentine tubules and pumping into said tubules a bleaching agent; and filling said root canal with a plastic dental material.

5. A method of root canal therapy comprising: establishing a closed aspirating system connecting the root and crown ends of the root canal; and aspirating treating agents therethrough.

6. A method of root canal therapy comprising: establishing a closed aspirating system connecting the root and crown ends of the root canal; establishing negative pressure in said system; and introducing a treating agent thereinto.

7. A method of root canal therapy comprising: establishing a closed aspirating system connecting the root and crown ends of the root canal; aspirating treating agents therethrough, and filling said root canal with a plastic dental material.

8. A method of root canal therapy comprising: establishing a closed aspirating system connecting the root and crown ends of the root canal; establishing negative pressure in said system; introducing a treating agent thereinto; and filling said root canal with a plastic dental material.

9. Apparatus for root canal therapy comprising: means adapted for sealed insertion in a hole leading to said root canal at the root apex; means adapted for sealed insertion in a hole leading to said root canal at the crown end, said two means forming a closed system; and means for aspirating treating agents through said closed system.

10. Apparatus for root canal therapy comprising: a needle adapted for insertion in a hole leading to said root canal at the root apex; a tube connected to said needle; a second needle adapted for insertion in a hole leading to said root canal at the crown end; means sealing said needles at their respective holes; and a means adapted for aspirating treating agents through said root canal.

11. Apparatus for root canal therapy comprising: a needle adapted for insertion in a hole leading to said root canal at the root apex; a tube connected to said needle, said tube having a normally closed exit port adjacent said needle and between the tube outlet and said needle; a second needle for insertion in a hole leading to said root canal at the crown end; means sealing said needles at their respective holes; and a means adapted for aspirating treating agents through said root canal.

12. Apparatus for root canal therapy comprising: sealed means adapted for insertion in a hole leading to said root canal at its root apical end; a bored cross member connected to said needle substantially perpendicular to the longitudinal axis of the tooth; a vertical tube connecting to said cross member, said tube being substantially parallel to the longitudinal axis of the tooth; a second cross member carried by said vertical tube carrying a tooth-engaging member, said tooth-engaging member being resiliently urged against said tooth; a second sealed needle carried by said second cross member, said second needle being adapted for insertion into a hole leading to said root canal at its crown end.

13. Apparatus for root canal therapy comprising: a sealed needle adapted for insertion in a hole leading to the root canal at its root apex; a tube connected to said sealed needle, said tube including a portion extending substantially parallel to the longitudinal axis of the tooth; a cross member riding slidable on said tube; a tooth-engaging member carried by said cross member; resilient means on said tube urging said cross member and said tooth-engaging means toward said tooth; and a second sealed needle adapted for insertion in a hole leading to said root canal at its crown end.

14. Apparatus for root canal therapy comprising: a sealed needle adapted for insertion in a hole leading to the root canal at its root apical end; a tube connected to said sealed needle, said tube including a portion extending substantially parallel to the longitudinal axis of the tooth; a cross member carried by said tube and carrying a tooth-engaging member, said tooth-engaging member being resiliently urged against said tooth; a threaded eyepiece carried slidably by said cross member; a threaded bushing carried by said eyepiece and coacting therewith to move on turning toward and away from said tooth; a needle carried within said bushing adapted for insertion in a hole leading to said root canal at its crown end; and a sealing gasket about said needle adjacent its toothward extremity, said gasket being abutted against by said bushing.

15. Apparatus for root canal therapy comprising: a needle adapted for insertion in a hole leading to the root canal at its root apical end; means for sealing said needle at said hole; a tube connected to said needle, said tube including a portion extending substantially parallel to the longitudinal axis of the tooth; a cross member riding on said tube; a second needle carried by said cross member, said needle being adapted for insertion in a hole leading to the root canal at its crown end; and means for sealing said second needle at said hole.

16. Apparatus for root canal therapy comprising: a needle adapted for insertion in a hole leading to the root canal at its root apical end; means for sealing said needle at said hole; a tube connected to said needle, said tube including a portion extending substantially parallel to the longitudinal axis of the tooth; said tube having a normally closed exit port adjacent said needle and between the tube outlet and said needle; a cross member riding on said tube; a second needle carried by said cross member, said needle being adapted for insertion in a hole leading to the root canal at its crown end; and means for sealing said second needle at said hole.

17. Apparatus for root canal therapy comprising: a sealed needle adapted for insertion in a hole leading to the root canal at its root apical end; a tube connected to said sealed needle, said tube including a portion extending substantially parallel to the longitudinal axis of the tooth; said tube having a normally closed exit port adjacent said needle and between the tube outlet and said needle; a cross member carried by said tube and carrying a tooth-engaging member, said tooth-engaging member being resiliently urged against said tooth; a threaded eyepiece carried slidably by said cross member; a threaded bushing carried by said eyepiece and coacting therewith to move on turning toward and away from said tooth; a needle carried within said bushing adapted for insertion in a hole leading to said root canal at its crown end; and a sealing gasket about said needle adjacent its toothward extremity, said gasket being abutted against by said bushing.

18. Apparatus for root canal therapy comprising: a sealed needle adapted for insertion in a hole leading to the root canal at its root apex; a tube connected to said sealed needle, said tube including a portion extending substantially parallel to the longitudinal axis of the tooth; said tube having a normally closed exit port adjacent said needle and between the tube outlet and said needle; a cross member riding slidable on said tube; a tooth-engaging member carried by said cross member; resilient means on said tube, urging said cross member and said tooth-engaging means toward said tooth; and a second sealed needle adapted for insertion in a hole leading to said root canal at its crown end.

19. Apparatus for root canal therapy comprising: means adapted for insertion in a hole leading to the root canal at its root apical end; means adapted for sealing said needle at said hole; a bored cross member connected to said needle and substantially perpendicular to the longitudinal axis of the tooth; a vertical tube connecting to said cross member substantially parallel to the longitudinal axis of the tooth, there being a normally closed exit port at the juncture of said cross member and said tube; a second cross member carried by said tube carrying a tooth-engaging member, said tooth-engaging member bearing resiliently against said tooth; a second needle carried by said second cross member, said second needle being adapted for insertion in a hole leading to the root canal at its crown end; and means adapted for sealing said needle at said hole.

20. Apparatus for root canal therapy comprising: a sealed needle adapted for insertion in a hole leading to the root canal at its root apex; a tube connected to said sealed needle, said tube including a portion extending substantially parallel to the longitudinal axis of the tooth; a cross member riding slidable on said tube, said cross member carrying a set screw adapted to engage serrations in said tube; a tooth-engaging member carried by said cross member; resilient means on said tooth urging said cross member and said tooth-engaging means toward said tooth; and a second sealed needle adapted for insertion in a hole leading to said root canal at its crown end.

WILBUR N. VAN ZILE.

REFERENCES CITED

The following references are of record in the file of this patent:

UNITED STATES PATENTS

| Number | Name | Date |
|---|---|---|
| 1,417,379 | Harvin | May 23, 1922 |
| 961,287 | Crane | June 14, 1910 |

FOREIGN PATENTS

| Number | Country | Date |
|---|---|---|
| 231,605 | Great Britain | Apr. 9, 1925 |